(12) United States Patent
Mortimer

(10) Patent No.: US 11,939,949 B2
(45) Date of Patent: Mar. 26, 2024

(54) WIND TURBINE BLADE

(71) Applicant: Vestas Wind Systems A/S, Aarhus (DK)

(72) Inventor: Jermaine Mortimer, Ventnor (GB)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/044,448

(22) PCT Filed: Sep. 7, 2021

(86) PCT No.: PCT/DK2021/050277
§ 371 (c)(1),
(2) Date: Mar. 8, 2023

(87) PCT Pub. No.: WO2022/053117
PCT Pub. Date: Mar. 17, 2022

(65) Prior Publication Data
US 2023/0323856 A1 Oct. 12, 2023

(30) Foreign Application Priority Data

Sep. 9, 2020 (DK) .............................. PA2020 70584

(51) Int. Cl.
*F03D 1/06* (2006.01)
*F03D 13/35* (2016.01)
(Continued)

(52) U.S. Cl.
CPC ........... *F03D 1/0675* (2013.01); *F03D 13/35* (2016.05); *F03D 80/30* (2016.05); *F03D 80/40* (2016.05);
(Continued)

(58) Field of Classification Search
CPC ............................... F03D 1/0675; F03D 13/35
See application file for complete search history.

(56) References Cited

U.S. PATENT DOCUMENTS

2009/0039650 A1* 2/2009 Nies ........................ F03D 80/40
290/55
2010/0021298 A1* 1/2010 Sandvad ................. F03D 17/00
416/61
(Continued)

FOREIGN PATENT DOCUMENTS

EP 1359321 A1 11/2003
WO 2005068834 A1 7/2005
(Continued)

OTHER PUBLICATIONS

International Searching Authority, International Search Report and Written Opinion issued in corresponding PCT Application No. PCT/DK202/050277, dated Dec. 22, 2021.
(Continued)

*Primary Examiner* — Woody A Lee, Jr.
*Assistant Examiner* — Cameron A Corday

(57) ABSTRACT

A wind turbine blade comprising a blade shell that extends in a spanwise direction from a root end of the blade to a tip end of the blade, the blade shell defining an internal blade volume within which at least one blade feature is located, the blade being provided with an RF position-identification means configured for detection by an RF detection means external to the blade to enable determination of a reference position for the blade and/or the blade feature. Aspects of the invention also relate to a method of detecting a reference position for a wind turbine blade.

10 Claims, 4 Drawing Sheets

(51) Int. Cl.
*F03D 80/30* (2016.01)
*F03D 80/40* (2016.01)

(52) U.S. Cl.
CPC ....... *F05B 2230/50* (2013.01); *F05B 2260/96* (2013.01)

(56) References Cited

U.S. PATENT DOCUMENTS

| | | | | |
|---|---|---|---|---|
| 2010/0209247 | A1* | 8/2010 | Becker | F03D 7/024 416/61 |
| 2011/0268569 | A1 | 11/2011 | Loh et al. | |
| 2013/0300117 | A1* | 11/2013 | Hjort | F03D 9/25 290/55 |
| 2018/0045174 | A1* | 2/2018 | Yarbrough | F03D 9/25 |
| 2019/0055929 | A1* | 2/2019 | Zhang | F03D 7/0296 |

FOREIGN PATENT DOCUMENTS

| | | | |
|---|---|---|---|
| WO | 2011137909 | A1 | 11/2011 |
| WO | 2012059107 | A1 | 5/2012 |
| WO | 2015055215 | A1 | 4/2015 |

OTHER PUBLICATIONS

Danish Patent and Trademark Office, Examination Report issued in corresponding Danish Application No. PA 2020 70584, dated Feb. 2, 2021.

* cited by examiner

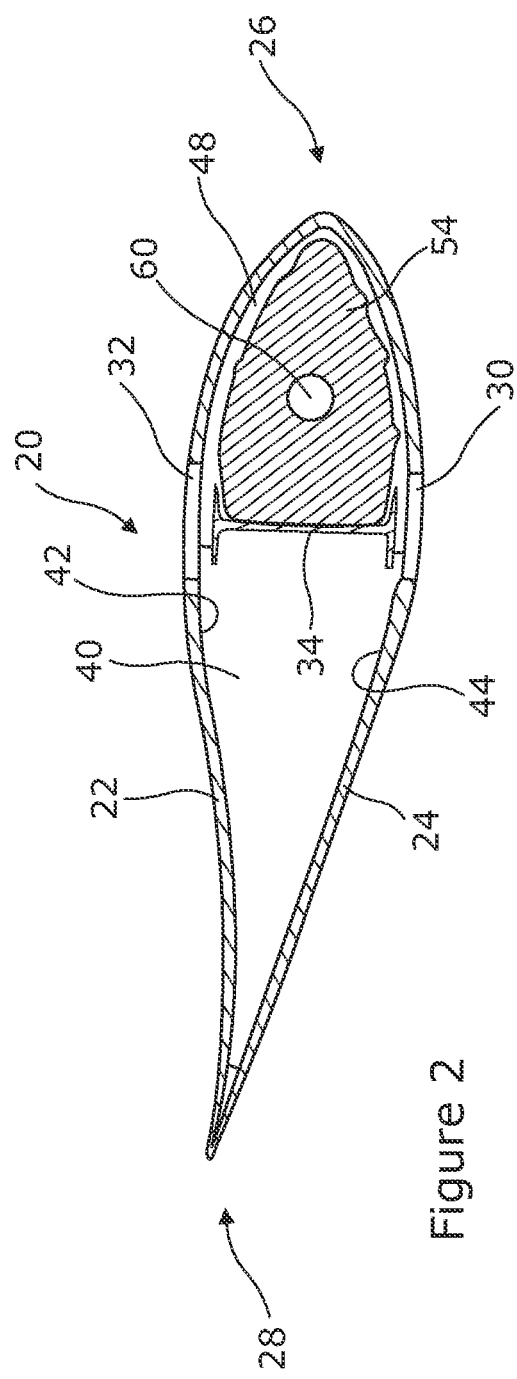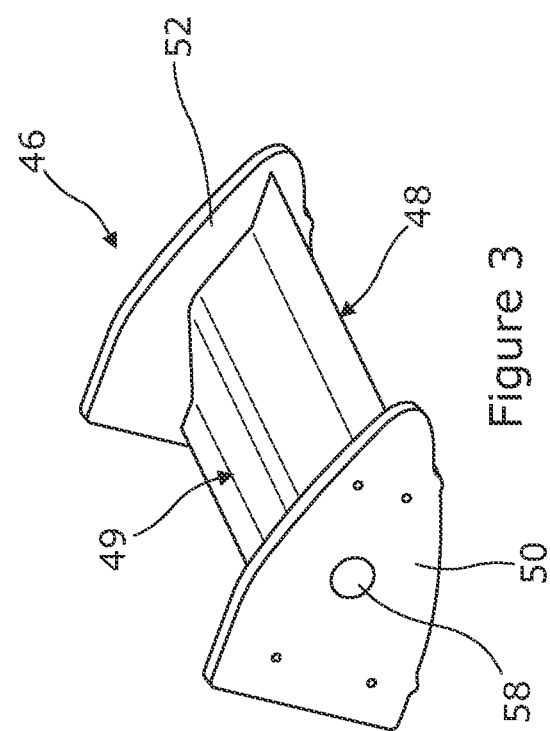

WIND TURBINE BLADE

TECHNICAL FIELD

The present invention relates generally to wind turbines and more specifically to a wind turbine blade. Further aspects of the invention concern methods relating to assembly and/or servicing of a wind turbine blade.

BACKGROUND

In a typical wind turbine, such as that shown in FIG. 1 and referred to generally as 10, a rotor is mounted on a tower 12, the rotor carrying a plurality of equidistantly spaced wind turbine blades 14, 16, 18. The rotor is coupled to a generator (not shown) so that, as wind power drives rotation of the blades 14, 16, 18, and hence the rotor, kinetic energy in the blades induced by the wind is converted into electricity through the generator. Modern wind turbine blades typically comprise a shell defining the aerodynamic contour of the blade. The shell is typically formed from two half shells which extend in a spanwise direction from a root end of the blade to a tip end of the blade, and in a chordwise direction between a leading edge of the blade and a trailing edge.

It is usual to provide the blades 14, 16, 18 with a balancing assembly to establish the correct balance between the three blades once assembled onto the rotor. The balancing assembly for each blade typically includes a ballast tank which is located within the internal volume of the blade. The ballast tank is filled with a ballast material by drilling through the shell of the blade and introducing the ballast material through the drilled opening into the ballast tank. Ballast material is introduced to each blade 14, 16, 18 in the correct proportion for balancing the mass moment between the blades. The ballasting process can occur in the factory when the blades are manufactured and assembled or occasionally may be performed in the field once the blades are installed on the tower. Modern wind turbine assemblies are very large, with towers of the order of 100 metres or so in height and blades of more than 60 metres in length. Consequently, maintenance and servicing of the blades in the field can pose difficulties due to the sheer height and scale of the assembly.

Regardless of where ballasting takes place, precision and accuracy in locating the balancing assembly within the blade is a necessity. The blades typically carry other internal components too, including lightning conductor systems and anti-ice components, and for servicing these components it is also necessary to have a reliable means of locating components within the blade volume. In known systems it is common to use a simple 'Tap test' to locate features of the blade, but this test lacks sophistication and can lead to inaccuracy in determining locations.

It is against this background that the present invention has been devised.

SUMMARY OF INVENTION

In a first aspect of the invention there is provided a wind turbine blade having a root end and a tip end. The wind turbine blade comprises a blade shell that extends in a spanwise direction from the root end to the tip end. The blade shell defines an internal blade volume within which at least one blade feature is located. The blade is provided with an RF position-identification means configured for detection by an RF detection means external to the blade to enable determination of a reference position for the blade and/or the blade feature.

The invention provides a particular advantage when applied to a wind turbine blade fitted with a balancing assembly, such as a ballast tank, to allow balancing of the blade. The invention allows a reference position for the ballast tank to be determined along the blade length, particularly the spanwise length, in an accurate and non-invasive manner. Thus, the blade shell can be drilled in the appropriate position to establish a suitable delivery path for introducing ballast material to the ballast tank.

In some embodiments, the RF position-identification means may be carried by the blade feature.

In other embodiments, the RF position-identification means is mounted on a surface of the blade feature.

The RF-position identification means need not by the blade feature itself, but instead may be carried by the blade (e.g. an internal surface of the blade) at a location corresponding to the reference position for the blade feature.

This may be advantageous if the blade feature is not suitable to have the RF-position identification device attached to it.

The RF position-identification means may include a plurality of RF position-identification devices, each of which is carried at a different position on the blade feature to define a plurality of reference positions for the blade feature.

The blade feature may take the form or include a balancing assembly, such as a ballast tank configured to receive a ballast material.

Alternatively, the blade feature may include a lightning receptor device.

The blade feature may include at least one anti-ice component.

In some embodiments, the RF detection means may be configured to identify the position of the RF position-identification means in the spanwise direction of the blade.

In some embodiments, the RF position-identification means includes a plurality of RF identification devices, each of which is mounted at a different position on an internal surface of the blade shell to define a plurality of reference positions for the blade.

In a second aspect, there is provided a method of detecting a reference position fora wind turbine blade having an internal blade volume defined by a blade shell, wherein a blade feature is located within the internal blade volume. The method comprises applying an RF position-identification means to the blade feature and/or the blade and generating, via the RF position-identification means, an RF position signal. The method further comprises detecting, at an RF detection means external the blade, the RF position signal; and determining the reference position based on detection of the RF position signal.

In the method, the RF position-identification means may include a plurality of RF position-identification devices arranged at regularly spaced locations on the blade shell, the method comprising; generating an RF position signal for each of the RF position-identification devices; detecting, at the RF detection means, the RF position signals; and determining a scale of reference positions based on detection of the RF position signals.

The invention also extends to a method of filling a ballast tank within the internal volume of a wind turbine blade according to the previous aspect of the invention, the method comprising applying the RF position-identification means to the ballast tank or to the blade at a position corresponding to the position of the ballast tank within the blade; using the method of the previous aspect to identify the location of the ballast tank within the internal blade volume by detecting the or each RF position signal; drilling, forming and/or machining an opening into the blade shell at a location dependent on the identified location of the ballast tank; and introducing a ballast material through the opening into the ballast tank.

Optional features described in relation to the first aspect of the invention are equally applicable to any other aspect of the invention, and repetition of these features is avoided purely for reasons of conciseness.

BRIEF DESCRIPTION OF FIGURES

Reference has already been made to FIG. 1 which is a perspective view of a wind turbine comprising three equi-angularly spaced wind turbine blades.

Embodiments of the present invention will now be described, by way of non-limiting example only, with reference to the accompanying figures, in which:

FIG. 2 is a cross section view, in a chordwise direction, of a wind turbine blade to illustrate a ballast tank located within an internal volume of the blade;

FIG. 3 is a perspective view of a ballast tank for use with the wind turbine blade in FIG. 2;

DETAILED DESCRIPTION

Figure 1:
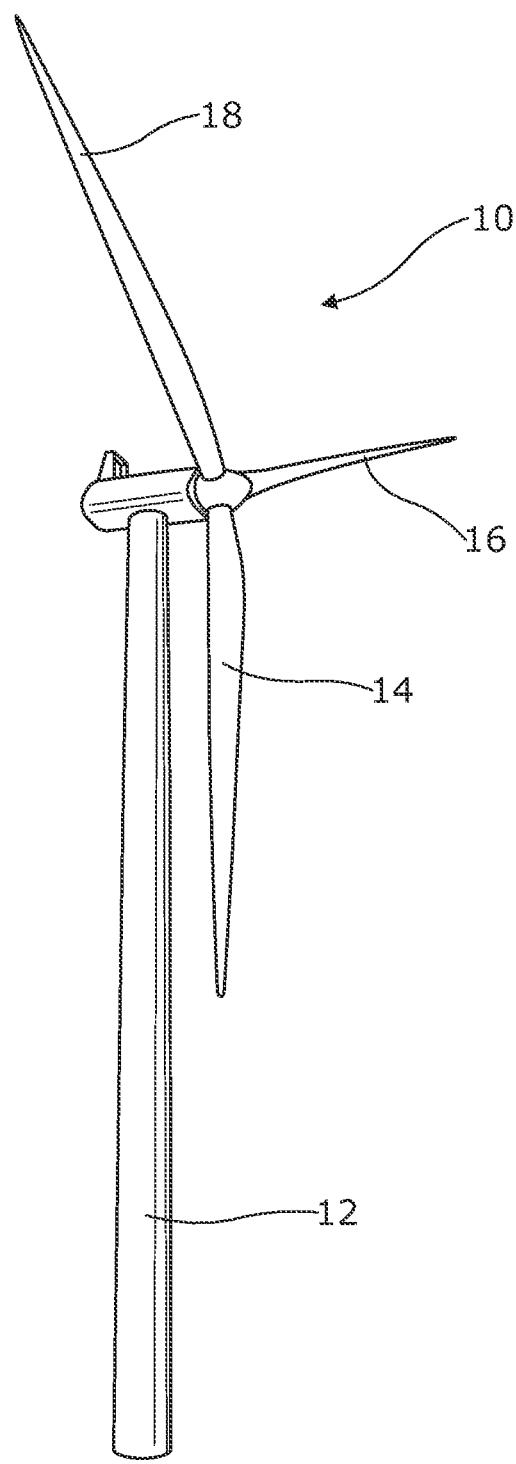

Referring to FIG. 2, a wind turbine blade 20 for use in a wind turbine 10 (such as that shown in FIG. 1) comprises a first half shell 22 and a second half shell 24 which each extend in a spanwise direction from a root end of the blade 20 to a tip end of the blade 20. In FIG. 2 the abbreviations WW, LW and LE refer to windward, leeward and leading edge, respectively. The blade 20 extends in a chordwise direction between a leading edge 26 of the blade 20 and a trailing edge 28 of the blade 20. The first and second blade half shells 22, 24 are joined together to form an enclosed blade shell which defines an aerodynamic contour for the blade 20 and is configured to capture energy from wind incident on the blade 20 as the blade rotates, in use, to drive a rotor. The blade 20 is provided with opposed spar caps, 30, 32, each on a respective one of the leeward (LW) and windward (WW) sides of the blade, and a shear web 34 connecting the spar caps which together form a reinforcing structure along the spanwise length of the blade 20.

The wind turbine with which the blade 20 is used comprises a plurality of blades mounted at equally spaced locations around the rotor, in the manner of the wind turbine shown in FIG. 1. The rotor is connected to a generator in a conventional manner to convert kinetic energy from the wind-driven blades into electricity.

The blade shell 22, 24 defines an internal blade volume 40 having an internal surface defined by respective internal skins, 42, 44, of the first and second half shells 22, 24. Referring also to FIG. 3, a balancing assembly, referred to generally as 46, including a ballast tank 48 located within the internal blade volume 40. The ballast tank 48 has an outer surface 49 and is closed in a sealing manner at each end by a bulk head or end plate, 50, 52. The ballast tank 48 and the end plates 50, 52 together define a ballast volume 54 which is configured to receive a ballast material. Each blade of the wind turbine assembly 10 is typically provided with a similar ballast tank so that any one or more of the blades can be filled with ballast material to the extent required. By adjusting the volume of ballast material within the ballast tanks, the masses of the blades can be adjusted and, hence, the mass moment of one blade relative to another can be adjusted to balance the blades.

Each end plate 50, 52 of the balancing assembly 46 may be provided with an opening 58 (only one of which is shown in FIG. 3) which may be in a central region of the respective plate 50. The ballast tank 48 itself may include an air passage 60 (not identified in FIG. 3) which extends through a central region of the ballast tank between the end plates 50, 52. The air passage is bounded by a wall of the ballast tank 48 of circular cross section, as shown in FIG. 2, and aligns, at each end, with the openings 58 in the plates 50, 52. The air passage 60 allows air to circulate within the internal volume 40 of the blade 20 to avoid air pressure build up within the internal volume 40, in use.

It is necessary for the ballast tank 48 to be filled with a ballast material to provide the required balancing moment across the blades of the wind turbine 10. The ballast material is introduced into the ballast tank 48 by drilling through the shells 22, 24 of the blade 20 and into the ballast tank 48 to create an opening (not shown). A ballast-delivery apparatus is then introduced into the internal volume 40 of the blade through the opening. Ballast material is then introduced into the ballast tank 48, via the ballast delivery apparatus, to achieve the required mass to achieve balance of the mass moment across the blades. The ballast material may initially be injected into the tank in a liquid form (such a polyurethane resin) for ease of insertion into the tank, where it may then subsequently harden. After the ballast tank has been filled, the hole in the shell is filled.

The ballast material is introduced into the ballast tank 48 after the blade has been assembled, in particular after the two shell sections 22, 24 have been adhesively bonded together. After the shells 22, 24 have been assembled the blade 20 is weighed so that the required mass of ballast material can be determined.

Prior to the drilling step into the ballast tank 48, it is therefore necessary to determine accurately the spanwise location of the ballast tank 48 within the internal volume of the blade 20.

Typically, the process of drilling into shells 22, 24 of the blade 20 and the ballast tank 48 is carried out in the factory where the blades are manufactured, prior to shipment of the blades to the field for assembly onto the wind turbine tower (item 12 in FIG. 1). Blades are typically matched by mass before being shipped to the installation site. The ballast process is then often repeated in the field, prior to the blade 20 actually being assembled onto the wind turbine tower, when it is clear which of the three blades are to be mounted on the same tower. Sometimes it is also necessary to perform the ballast process after the blades are installed on the tower.

When performing the ballast process in the field it is especially difficult to establish an accurate spanwise location of the ballast tank 48 for drilling purposes when working in external conditions and at the considerable heights of the wind turbine tower 12. In any case, identifying the position of the ballast tank 48 within the internal volume 40 of the blade 20 is key to ensuring that ballast material is delivered efficiently and in the correct place. Clearly mis-identifying the spanwise location of the ballast tank 48 can cause unnecessary damage to the shells 22, 24 of the blade 20 with costly consequences.

In the present invention, it has been recognised that the use of an RF position-identification means on the blade 20 provides a solution to the problem of accurately locating the spanwise location of the ballast tank 48 within the internal volume 40 of the blade 20.

Figure 4:
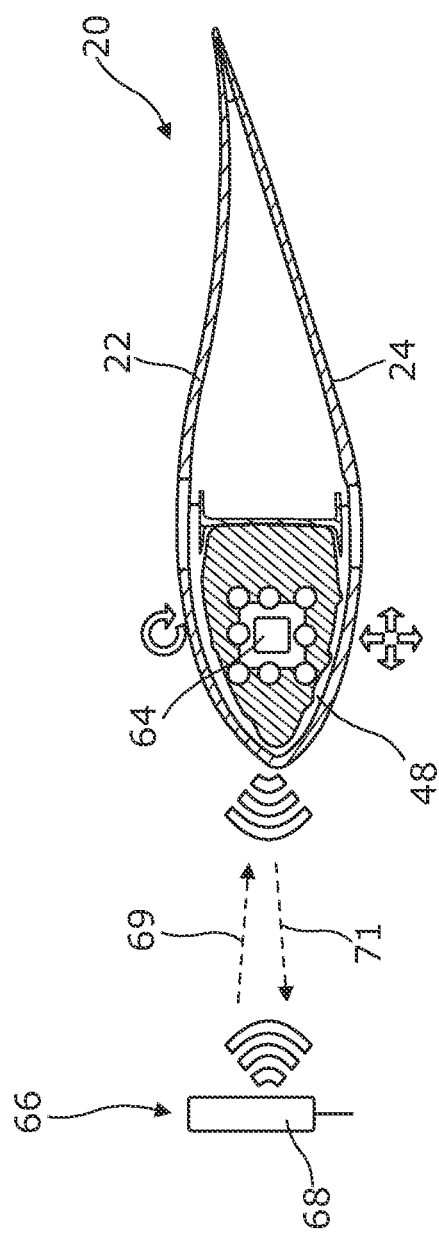
FIG. 4 is a cross section view, in a chordwise direction, of the wind turbine blade in FIG. 2 together with an RF position-identification means for the blade.

Referring to FIG. 4, the ballast tank 48 is provided with an RF position-identification device 64 (also referred to as an RFID chip or tag) at a predetermined position on a surface of the ballast tank 48. The RFID chip 64 includes a transponder (not shown) and an antenna (also not shown) for receiving and transmitting RF signals. The signals transmitted from the RFID chip 64 are detected at an RF detection means 66. The RF detection means 66 includes an RF transmitter/receiver 68 and is used to identify the exact location of the RFID chip 64. In an initial step the RF transmitter/receiver transmits an interrogation signal 69 to interrogate the RFID chip 64. In a subsequent step, the RF transmitter/receiver 68 receives an RF position signal 71 transmitted from the RFID chip 64 following interrogation to enable a reference position of the RFID chip 64, and hence the ballast tank 48, to be determined.

The RF position-identification device may be attached directly to the blade feature, or alternatively may be attached to an internal surface of the blade shell at a position corresponding to the location of the blade feature. It may be helpful to avoid attachment of the RF position-identification device to the blade feature if the material of the blade feature is not suitable for the device to be mounted to. For example, the ballast tank is typically formed of a mesh material which is not always suitable for the mounting of the RF position-identification device, so in such circumstances it may be more useful to mount the device to the internal surface of the blade shell instead, at a position corresponding to the location of the blade feature.

More specifically, during balancing of the blade 20 during manufacture (or when servicing) when it is required to determine the position of the ballast tank 48 within the internal blade volume 40, the RF interrogation signal 69 is transmitted from the RF detection means 66 to interrogate the RFID chip 64 within the blade 20. The interrogation signal 69 prompts the transponder within the RFID chip 64 to generate the RF position signal 71. The RF position signal 71 is transmitted via the antenna back to the RF transmitter/receiver 68 where it is detected to identify a reference position for the chip 64. Once the location of the RFID chip 64 has been identified, the shells 22, 24 of the blade can be drilled with confidence in accordance with the reference position to access the internal volume of the ballast tank 48. The ballast tank 48 can then be filled with the required amount of ballast material for balancing purposes.

This RFID position detection method is based on an active reader/passive chip principle, in which the RFID chip 64 only responds to an interrogation signal 69 from the RF transmitter/receiver 68. In other embodiments it would be possible to employ an active RFID chip which provides a return position signal 71 for detection by the RF transmitter/receiver 68, even without interrogation.

In FIG. 4, the RFID chip 64 is provided on the ballast tank 48, but it would also be possible to provide the RFID chip 64 on one of the end plates 50, 52. The RFID chip may be provided anywhere on the balancing assembly 46.

In other embodiments, multiple RFID chips 64 may be provided on the ballast tank 48 to provide additional accuracy in determining the position of the ballast tank. In one embodiment, in order to establish a still more accurate position for the ballast tank 48 within the internal volume 40 of the blade 20, a plurality of RFID chips 64 may be located on the ballast tank 48 and/or end plates 50, 52. The use of multiple RFID chips 64 allows for a multiple reference positions for the ballast tank 48 to be determined. In this way, if required, a complete "footprint" of the ballast tank 48 profile within the internal volume 40 of the blade 20 can be established. From this footprint, the position of the most appropriate drilling location for delivery of the ballast material can be determined. In many scenarios, however, the identification of just a single RFID chip 64 will be sufficient to enable a suitable drilling location into the ballast tank 48 to be determined. This is because it is not essential that the ballast tank 48 is drilled at any particular spanwise location on the blade 20, but only that the drilling enters the ballast tank 48 somewhere to allow ballast material to be introduced into the tank 48.

Figure 5:
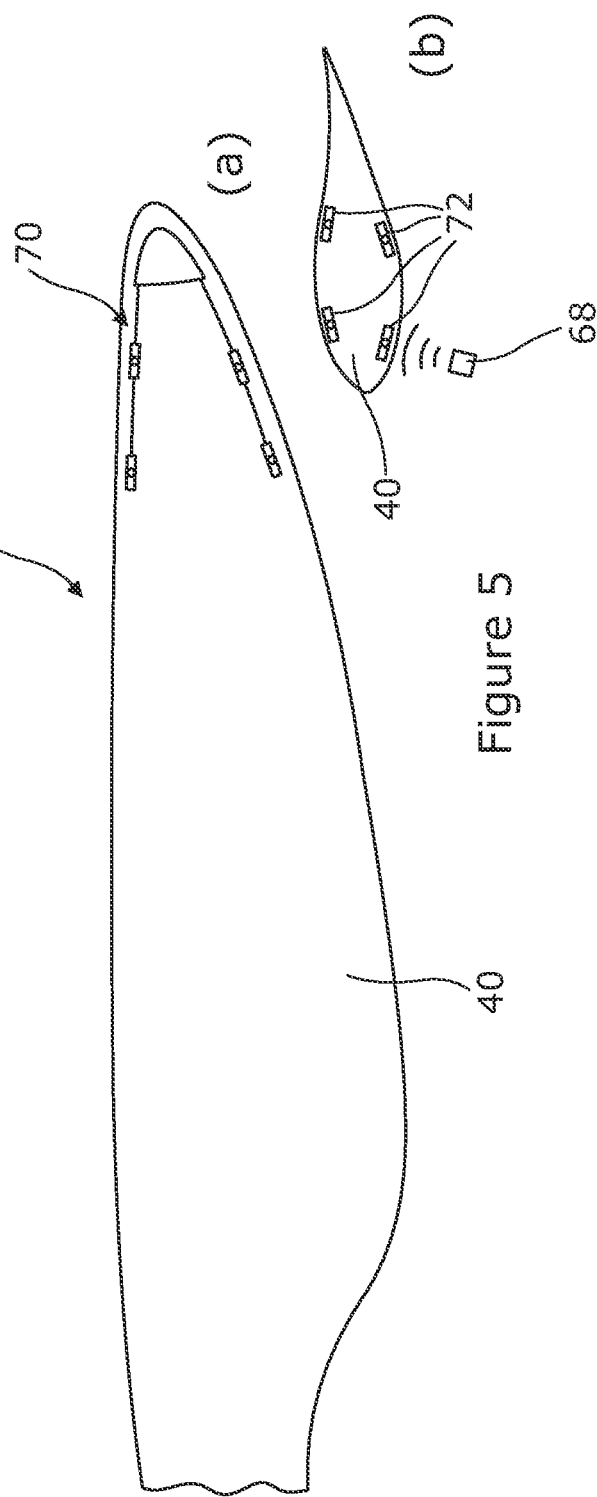
FIG. 5(a) is a cross-section view, in a spanwise direction, of a wind turbine blade having a lightning conductor system
FIG. 5(b) is a cross-section view, in a chord-wise direction, of the wind turbine blade in FIG. 5(a)

Other features within the internal volume 40 of the blade 20 may also be provided with RF position-identification means to enable their locations to be determined accurately, for example for the purpose of servicing and maintenance. Referring to FIGS. 5(*a*) and 5(*b*), the blade 20 is typically provided with a lightning conductor system 70 including a plurality of internal lightning receptor blocks 72. Each lightning receptor block 72 is provided with an RFID chip (not identified) for interrogation by the RFID detection means 66. In the same manner as described previously for the ballast tank 48, the system is based on an active reader/passive chip principle so that an interrogation signal 69 is provided by the transmitter of the RFID detection means 66 to the lightning conductor system 70. On receipt of the interrogation signal 69, the RFID chip on the lightning receptor 72 transmits an RF position signal 71 back to the RF transmitter/receiver 68. Detection of the transmitted position signal from the RFID chip can be used to determine the position of the lightning receptor blocks 72 from which the signal originated and, hence, an accurate determination of the location of the lightning receptor block 72 within the internal volume of the blade 20 can be determined. After the location of the internal lightning receptor block 72 has been identified, the blade shell may be drilled so that an external lightning receptor (not identified) can be connected to the lightning receptor block.

Figure 6:
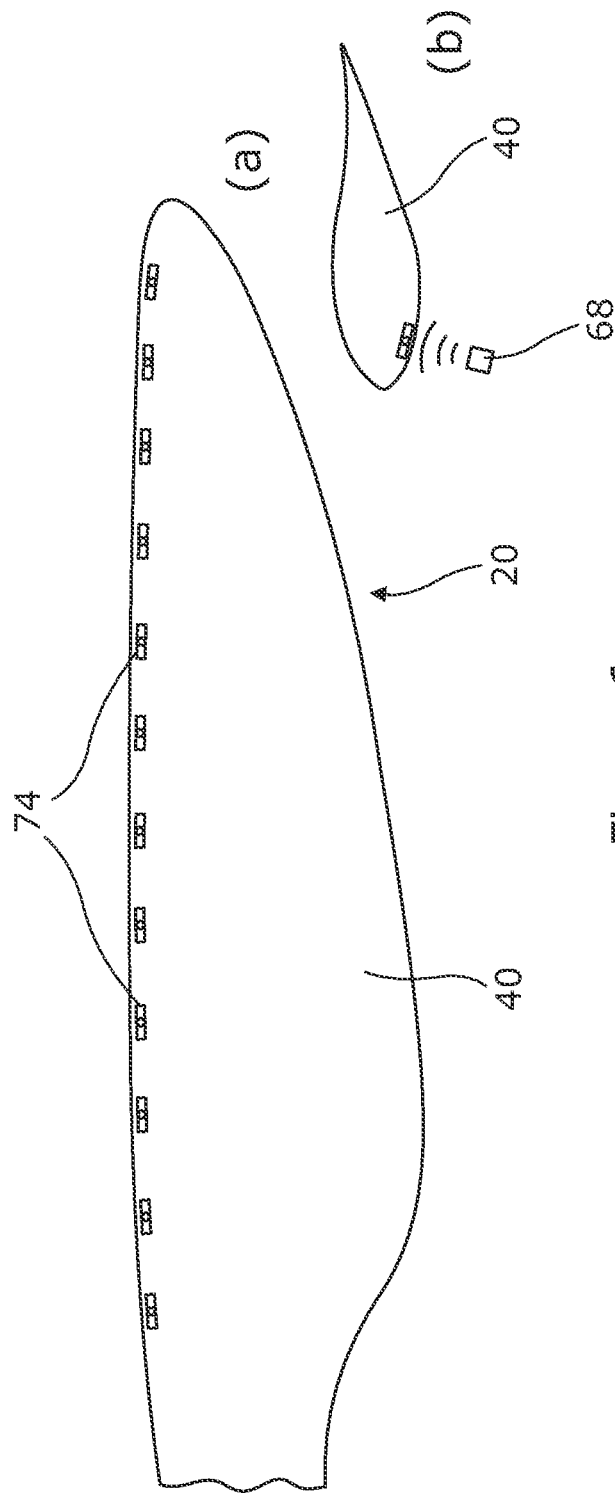
FIG. 6(a) is a cross-section view, in a spanwise direction, of a wind turbine blade having an anti-ice system
FIG. 6(b) is a cross-section view, in a chord-wise direction, of the blade in FIG. 6(a).

Referring to FIGS. 6(*a*) and 6(*b*), the wind turbine blade 20 may also be fitted with an anti-ice system including a plurality of anti-ice components 74 (two of which are identified). An RFID position-identification chip (not identified), as described previously, is mounted to each one of the anti-ice components 74 so that interrogation of the RFID chip on each anti-ice component by the RF transmitter/receiver 68 can be used to determine where along the spanwise length of the blade 20 the anti-ice components 74 are located.

In another embodiment of the invention, a plurality of RFID chips may be located on the internal skin 42, 44 of the one of the blade half shells 22, 24. The RFID chips are provided at regularly spaced locations to provide a reference scale for positions on the blade 20. This avoids the need to mark or identify positional information along the spanwise length of the blade 20. As the position of the ballast tank 48 is known, the user can use the RF detection means to interrogate the blade 20 and determine the position of the RFID chips to establish a series of reference positions along the blade length. If the position of the ballast tank 48 or other feature within the internal volume 40 of the blade 20 is recorded on assembly of the blade 20 when the ballast tank 48 is installed, a position reference scale can then be used to locate the ballast tank 48 once the blade shells 22, 24 are closed.

It will be appreciated that there may be benefits in applying the RF position-identification means both to the blade, for example to define the reference scale, and/or the blade feature, such as the ballast tank.

Many modifications may be made to the examples described above without departing from the scope of the present invention as defined in the accompanying claims. It will be appreciated that features described in relation to each of the examples above may be readily combined with features described with reference to other examples without departing from the scope of the invention as defined by the following claims.

The invention claimed is:

1. A method of increasing a weight of at least one of a plurality of wind turbine blades configured to form a rotor of a wind turbine for balancing the rotor, the at least one wind turbine blade comprising a blade shell that extends in a spanwise direction from a root end of the wind turbine blade to a tip end of the wind turbine blade, the blade shell defining an internal blade volume within which a ballast tank is located, the method comprising:
    applying an RF position-identification means to the ballast tank or to the at least one wind turbine blade at a position corresponding to the position of the ballast tank within the at least one wind turbine blade;
    identifying the location of the ballast tank within the internal blade volume by:
        generating, via the RF position-identification means, an RF position signal; and
        detecting, at an RF detection means external to the at least one wind turbine blade, the RF position signal; and
    determining the ballast tank position based on detection of the RF position signal;
    drilling, forming and/or machining an opening into the blade shell at a location dependent on the identified location of the ballast tank; and
    introducing a ballast material through the opening into the ballast tank.

2. The method as claimed in claim 1, wherein applying the RF position-identification means further comprises applying the RF position-identification means to the ballast tank.

3. The method as claimed in claim 2, wherein applying the RF position-identification means further comprises mounting the RF position-identification means on a surface of the ballast tank.

4. The method as claimed in claim 2, wherein applying the RF position-identification means further comprises applying a plurality of RF position-identification devices, each of which is carried at a different position on the ballast tank to define a plurality of reference positions for the ballast tank.

5. The method as claimed in claim 1, wherein applying the RF position-identification means further comprises applying the RF position-identification means to the blade at a location corresponding to the ballast tank.

6. The method as claimed in claim 1, wherein the at least one of the plurality of wind turbine blades includes each of the plurality of wind turbine blades, and wherein the ballast tanks in the plurality of wind turbine blades collectively define a balancing system for balancing the rotor of the wind turbine.

7. The method as claimed in claim 6, wherein the applying, identifying, determining, drilling, forming and/or machining, and introducing steps are performed for each of the plurality of wind turbine blades that form the rotor of the wind turbine.

8. The method as claimed in claim 1, wherein determining the ballast tank position based on detection of the RF position signal further comprises determining the ballast tank position in the spanwise direction of the at least one wind turbine blade based on detection of the RF position signal.

9. The method as claimed in claim 1, wherein the at least one wind turbine blade further comprises a lightning receptor device having RF position-identification means applied to the lightning receptor device or to the at least one wind turbine blade at a position corresponding to the lightning receptor device.

10. The method as claimed in claim 1, wherein the at least one wind turbine blade further comprises at least one anti-ice component having RF position-identification means applied to the at least one anti-ice component or to the at least one wind turbine blade at a position corresponding to the lightning receptor device.

* * * * *